(12) United States Patent
Gendre et al.

(10) Patent No.: US 10,800,508 B2
(45) Date of Patent: Oct. 13, 2020

(54) AIRCRAFT EQUIPPED WITH A SYSTEM FOR ESTIMATING THE PARAMETERS OF AN IMPACT

(71) Applicant: Airbus (S.A.S.), Blagnac (FR)

(72) Inventors: Didier Gendre, Toulouse (FR); Dimitri Goutaudier, Paris (FR)

(73) Assignee: Airbus (S.A.S.), Blagnac (FR)

( * ) Notice: Subject to any disclaimer, the term of this patent is extended or adjusted under 35 U.S.C. 154(b) by 0 days.

(21) Appl. No.: 16/458,560

(22) Filed: Jul. 1, 2019

(65) Prior Publication Data

US 2020/0010166 A1  Jan. 9, 2020

(30) Foreign Application Priority Data

Jul. 2, 2018  (FR) ...................................... 18 56096

(51) Int. Cl.
| | | |
|---|---|---|
| *B64C 1/12* | (2006.01) | |
| *B64D 45/00* | (2006.01) | |
| *G01L 5/00* | (2006.01) | |

(52) U.S. Cl.
CPC ................ *B64C 1/12* (2013.01); *B64D 45/00* (2013.01); *G01L 5/0052* (2013.01); *B64D 2045/008* (2013.01); *B64D 2045/0085* (2013.01)

(58) Field of Classification Search
CPC .. B64D 45/00; B64D 2045/0085; B64C 1/12; B64C 1/14; B64C 1/1461; G01L 5/0052; G07C 5/008; G07C 5/0085
USPC .......................................... 340/945, 981, 983
See application file for complete search history.

(56) References Cited

U.S. PATENT DOCUMENTS

| | | | |
|---|---|---|---|
| 2016/0200449 A1* | 7/2016 | Fu .......................... | B64D 45/00 701/3 |
| 2019/0064122 A1* | 2/2019 | Berenbaum ............ | G01N 29/04 |
| 2019/0228156 A1* | 7/2019 | Thumati ............... | G06F 16/903 |

FOREIGN PATENT DOCUMENTS

| | | |
|---|---|---|
| EP | 3 043 322 A1 | 7/2016 |
| KR | 10-2013-0027729 A | 3/2013 |

OTHER PUBLICATIONS

Cusano et al., "Experimental Modal Analysis of an Aircraft Model Wing by Embedded Fiber Bragg Grating Sensors," IEEE Sensors Journal, vol. 6, No. 1, pp. 67-77 (2006).
French Search Report for Application No. 1856096 dated Apr. 12, 2019.

* cited by examiner

*Primary Examiner* — Hung T Nguyen
(74) *Attorney, Agent, or Firm* — Jenkins, Wilson, Taylor & Hunt, P.A.

(57) ABSTRACT

An aircraft with a system for estimating the parameters of an impact. The aircraft includes a skin forming an outer surface of the aircraft, the aircraft equipped with a system for estimating the parameters of an impact including an array of sensors attached to the skin and a central processing unit connected to the array, the array of sensors including a first set of sensors providing data relating to elastic waves, the central processing unit configured for assessing the parameters of an impact from the data of the sensor array and a response model of the skin to external excitations calculated from the modal properties of the skin.

9 Claims, 6 Drawing Sheets

AIRCRAFT EQUIPPED WITH A SYSTEM FOR ESTIMATING THE PARAMETERS OF AN IMPACT

CROSS-REFERENCE TO RELATED APPLICATION

This application claims priority to French patent application number 18 56096 filed on Jul. 2, 2018, the entire disclosure of which is incorporated by reference herein.

TECHNICAL FIELD

The disclosure herein relates to an aircraft equipped with a system for estimating the parameters of an impact.

BACKGROUND

A plurality of service vehicles move around an aircraft during the phases of refueling or loading/unloading on the ground. It may happen that parts of the vehicles, such as ladders or ramps, impact the outer surface, or "skin", of the aircraft.

Operators locate and assess the severity of the impact during fuselage inspection operations, either by visual identification or with the aid of inspection means such as flying drones provided with optical devices for inspecting the fuselage. Following the inspection operation, the operators draw up a detailed report of the event and implement, optionally according to the severity of the impact, a maintenance operation for repairing the skin of the fuselage.

For optimizing and speeding up the inspection operations, there is a need for aircraft to be able to self-diagnose after an impact in order to provide accurate estimates of the location and severity of the impact for the operators. The latter will then carry out targeted and efficient inspection operations on the skin of the aircraft.

SUMMARY

An object of the disclosure herein is to wholly or partly meet this need and relates to an aircraft comprising a skin forming an outer surface of the aircraft, the aircraft being equipped with a system for estimating the parameters of an impact comprising an array of sensors attached to the skin and a central processing unit connected to the array, the sensor array comprising a first set of sensors providing data relating to elastic waves, the central processing unit being configured for assessing the parameters of an impact from the data of the sensor array and a response model of the skin to external excitations calculated from the modal properties of the skin.

The disclosure herein also relates to a method for estimating the parameters of an impact on the skin of an aircraft, the aircraft being equipped with a system for estimating the parameters of an impact comprising an array of sensors attached to the skin and a central processing unit connected to the array, the sensor array comprising a first set of sensors providing data relating to elastic waves, the central processing unit being configured for assessing the parameters of an impact from the data of the sensor array and a response model of the skin to external excitations calculated from the modal properties of the skin, the method comprising the following steps:

a step of comparing in which the central processing unit receives the signals from each of the sensors of the sensor array and compares the amplitude of each of the signals to a predetermined threshold characterizing an abnormal event;

a step of locating an impact area, implemented if one of the signals from the sensors of the sensor array has an amplitude which exceeds the predetermined threshold, and in which the central processing unit determines an area of the skin in which an impact has taken place of an element external to the aircraft with the skin;

a step of determining, simultaneously with the step of locating an impact area, in which the central processing unit determines, from the signals of the sensors of the sensor array, an instant of impact corresponding to the instant of the contact of the element external to the aircraft with the skin;

a step of processing the vibration measurements, in which the central processing unit receives the signal from a sensor of the first set of sensors from a time subsequent to the instant of impact and for a predetermined duration;

a step of optimizing in which the central processing unit calculates an estimate of the parameters of the impact, the estimates being calculated from the signals of the sensor of the first set of sensors processed in the preceding step and from a mathematical response model of the sensor of the first set to any excitations;

a step of locating a point of impact in which the central processing unit determines the coordinates of an estimated point of impact, termed a "candidate point of impact" from a collinearity search among the rows of a modal matrix of the skin and the estimate of the contributions of vibration modes of the skin;

a step of estimating the energy of the impact, in which the central processing unit estimates the impact energy at each candidate point of impact;

a step of warning, in which the central processing unit transmits a warning signal if the estimate of the intensity of the impact at a candidate point is greater than a predetermined threshold.

BRIEF DESCRIPTION OF DRAWINGS

The features of the disclosure herein mentioned above, as well as others, will appear more clearly on reading the following description of an embodiment, the description being made in relation to the attached, example figures, in which.

DETAILED DESCRIPTION

Figure 1:
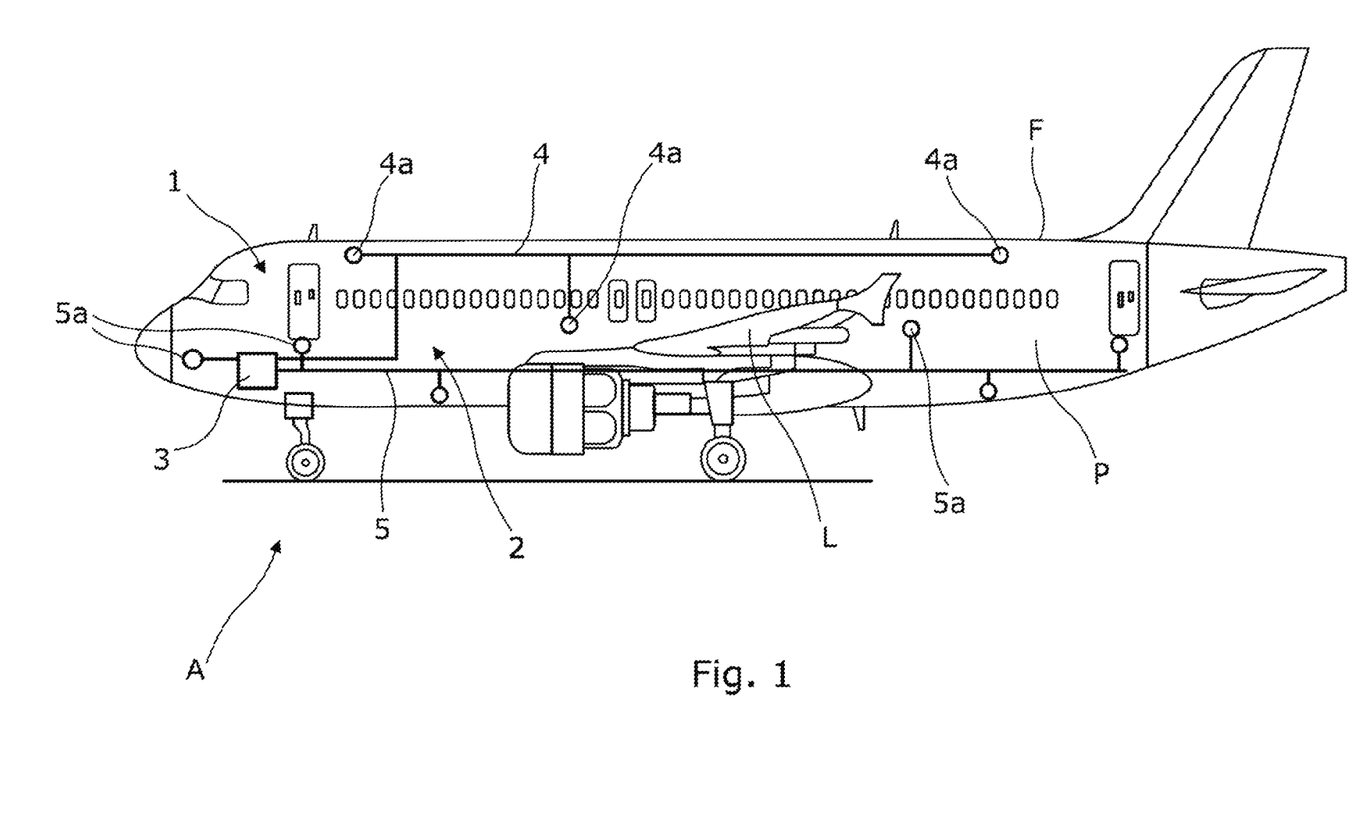
FIG. 1 is a view of an aircraft equipped with a system for estimating the parameters of an impact on the skin of the aircraft, according to an embodiment of the disclosure herein.
Figure 2:
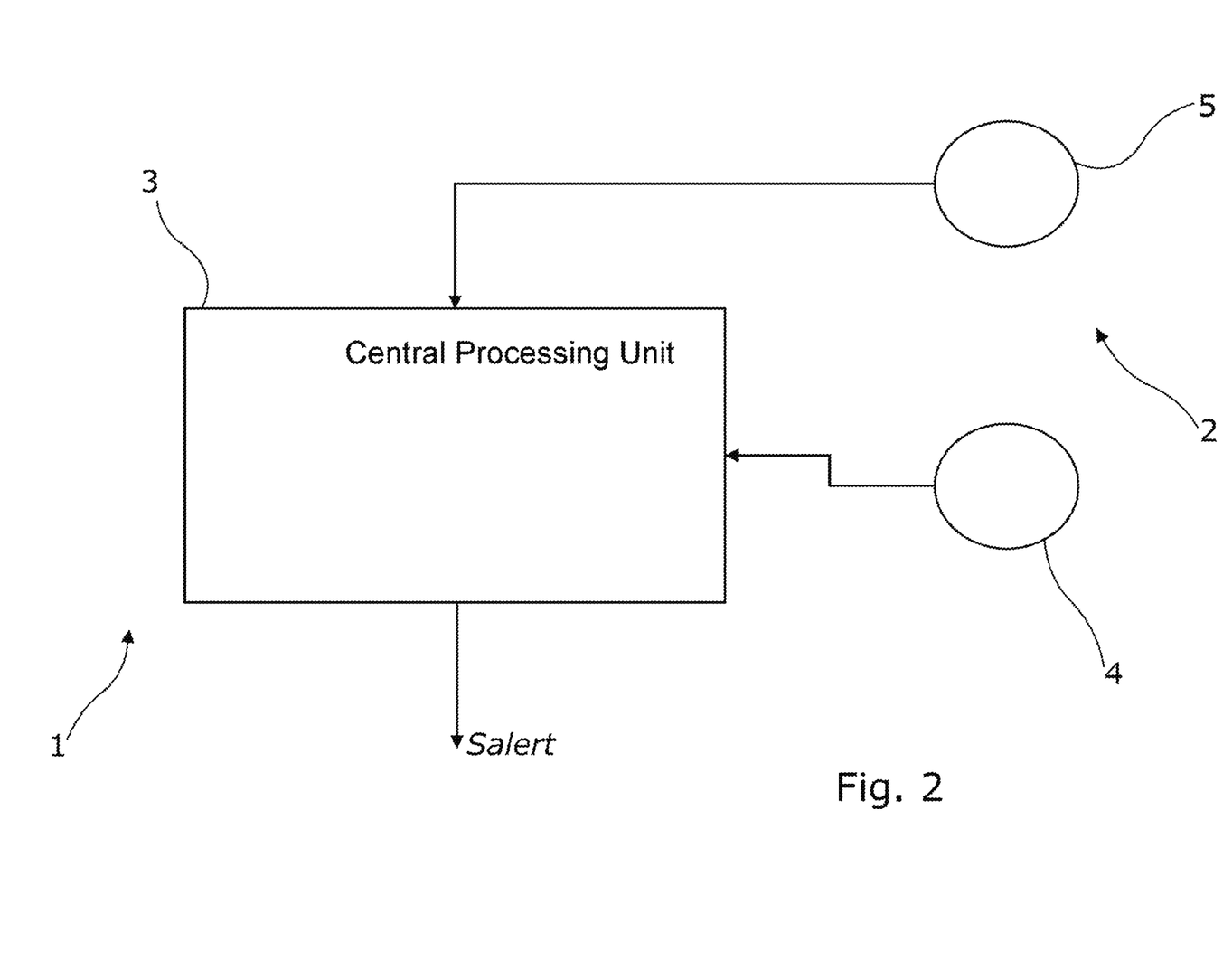
FIG. 2 is a schematic view of the system for estimating the parameters of an impact represented in FIG. 1.

With reference to FIGS. 1 and 2, an aircraft A comprises a fuselage F to which the wings L are attached. The fuselage F like the wings L are made by assembling panels (not represented), e.g. made of composite materials, attached to a metal structure (not represented) which forms the skeleton of the aircraft A. The panels form the outer surface, or skin P, of the aircraft.

An impact occurring on the skin P of the aircraft A at an instant of impact to (corresponding to the instant of the contact of an element external to the aircraft with the skin P), generates elastic waves which will, from the position of the point of impact F be propagated in the skin P for a time which depends on the dimensions of the aircraft A and on the intensity I of the impact then be reflected to the boundaries of the aircraft prior to being superimposed on damped vibration modes.

According to the disclosure herein, the aircraft A is equipped with a system for assessing the parameters (position of the point of impact, intensity, duration, position of the peak, asymmetry of the peak, etc.) of an impact 1. The latter comprises an array of sensors 2 attached to the panels (on the face of the panels facing towards the interior of the aircraft) for measuring data relating to the impacts, and a central processing unit 3 connected to the sensor array 2 and configured for assessing the parameters of an impact from the data of the sensor array 2 and a response model of the skin P to external excitations.

The response model of the skin is calculated from the modal properties of the skin P determined by a modal analysis of the skin P performed experimentally, or numerically by a finite element model of the skin. The modal properties of the skin P comprise the modal matrix ϕ of the skin, the eigenfrequencies, the modal deformations and modal dampings of certain vibration modes of the skin, termed "discriminant modes" which are obtained by calculating the modal deformations of the skin. The discriminant modes are the vibration modes of the skin P whereof the contribution in the measured response of the skin P to an impact characterizes the point of impact F. The discriminant modes of the skin P of an aircraft A are, for example, the first 10 vibration modes of the aircraft, at frequencies ranging from 0.7 Hz to 10 Hz.

The sensor array 2 comprises a first set of sensors 4 and a second set of sensors 5. The sensors 4a, 5a of the two sets 4, 5 are attached to some panels, on their inner face (i.e. the face directed towards the interior of the aircraft), The coordinates of each sensor 4a, 5a, in a reference frame linked to the aircraft A, are recorded in a memory of the central processing unit 3. The first set of sensors 4 provides data relating to the elastic waves, and the second set of sensors 5 provides data relating to the temporal detection of an instant of impact on the skin for assisting the first set of sensors 4 in determining the instant of impact to.

The data relating to the elastic waves measured by the first set of sensors 4 comprise the data relating to the elastic waves being propagated in the skin P as well as the vibration measurements. The vibration measurements are data relating to the elastic waves when these are superimposed on spatially stationary waves, known as vibration modes, which are temporally damped.

The sensors 4a of the first set of sensors 4 are displacement sensors or accelerometers. Accelerometers are advantageous since the signal emitted by an accelerometer attached to the skin P which vibrates following an impact, has an amplified amplitude and a better signal/noise ratio, than those of a signal emitted by a displacement sensor for the same conditions.

Each sensor 4a of the first set 4 is placed at a particular point, termed the "neutral point" of the skin P which does not preferably vibrate on a discriminant mode of the skin (i.e. the amplitude of the waveform at this point has a substantially uniform amplitude, in absolute value, for all the discriminant modes), The positioning of the sensors 4a of the first set 4 at the neutral points increases the robustness and accuracy of the estimate of the impact parameters performed by the central processing unit 3. The coordinates of the neutral points of the skin P are obtained by determining the closest points to the intersections of the modal deformations of the discriminant modes of the skin P.

The sensors 5a of the second set of sensors 5 are, for example, piezoelectric type sensors, with a high sampling rate and sensitivity, for recording the deformations of the skin P following the propagation of an elastic wave in the latter. As a variant, the sensors 5a of the second set of sensors 5 are microphones.

The sensors 5a of the second set of sensors 5 are distributed over the skin P of the aircraft in the areas that are statistically the most impacted of the skin P of the aircraft A. The areas statistically the most impacted by impacts from vehicles/external elements, are on the lower part of the fuselage (e.g. on the doors of the cargo bays), or the undersurface of the wing.

The central processing unit 3, in a known manner comprises a processor (not represented) and memories (not represented) containing instructions executed by the processor. The central processing unit 3 processes in real time the information from the array of sensors 2, and implements a method for estimating the parameters of an impact, using the data provided by the first array of sensors 4, as soon as an impact has been detected by the first and/or the second set of sensors 4, 5. The central processing unit 3 transmits a warning signal Salert to the operators if the intensity I of the impact exceeds a predetermined threshold G characteristic of damage to the skin P of the aircraft A.

Figure 3:
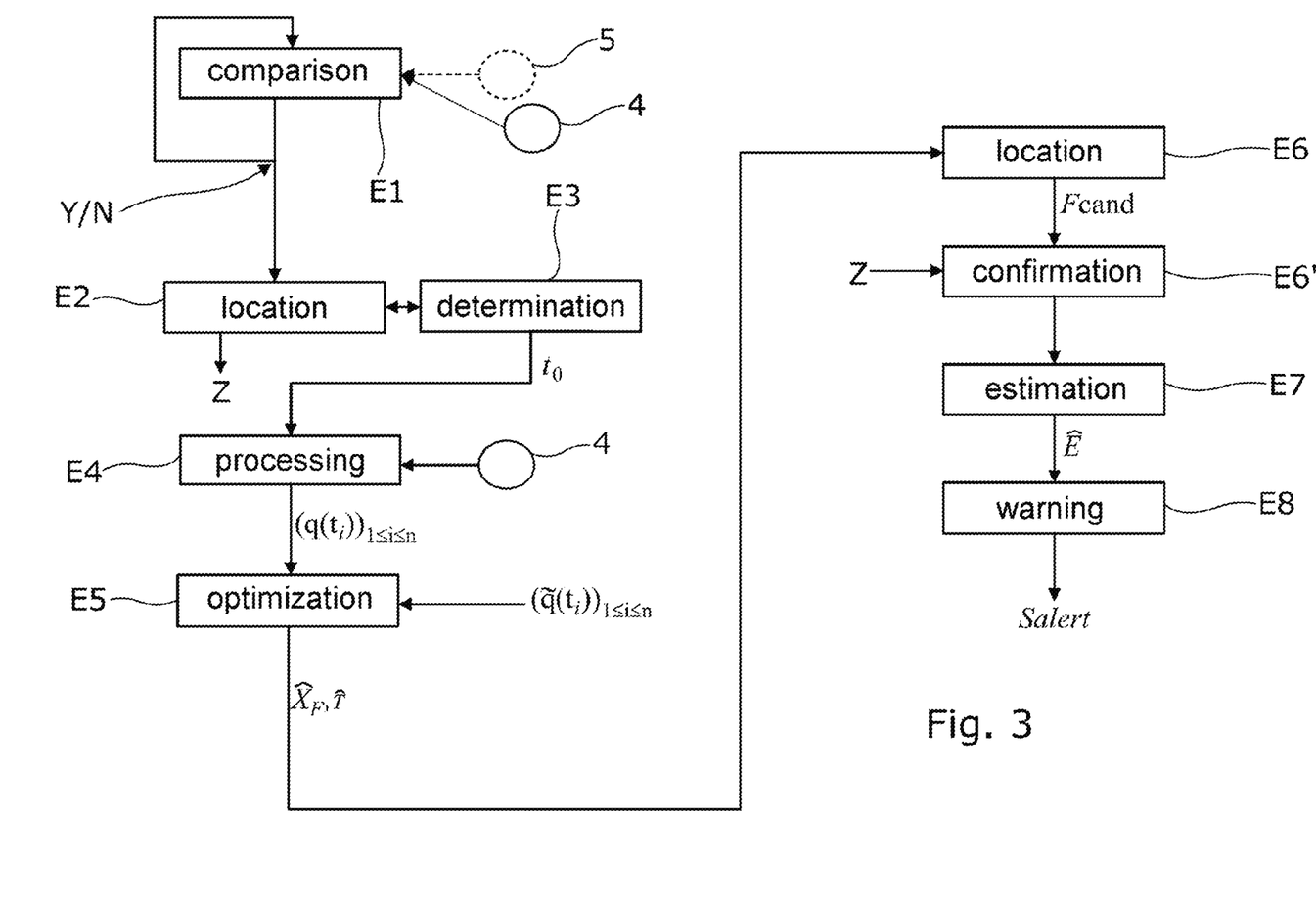
FIG. 3 is a schematic view of the steps of a method for estimating the parameters of an impact on the skin of an aircraft implemented by the system represented in the figure.
Figure 4:
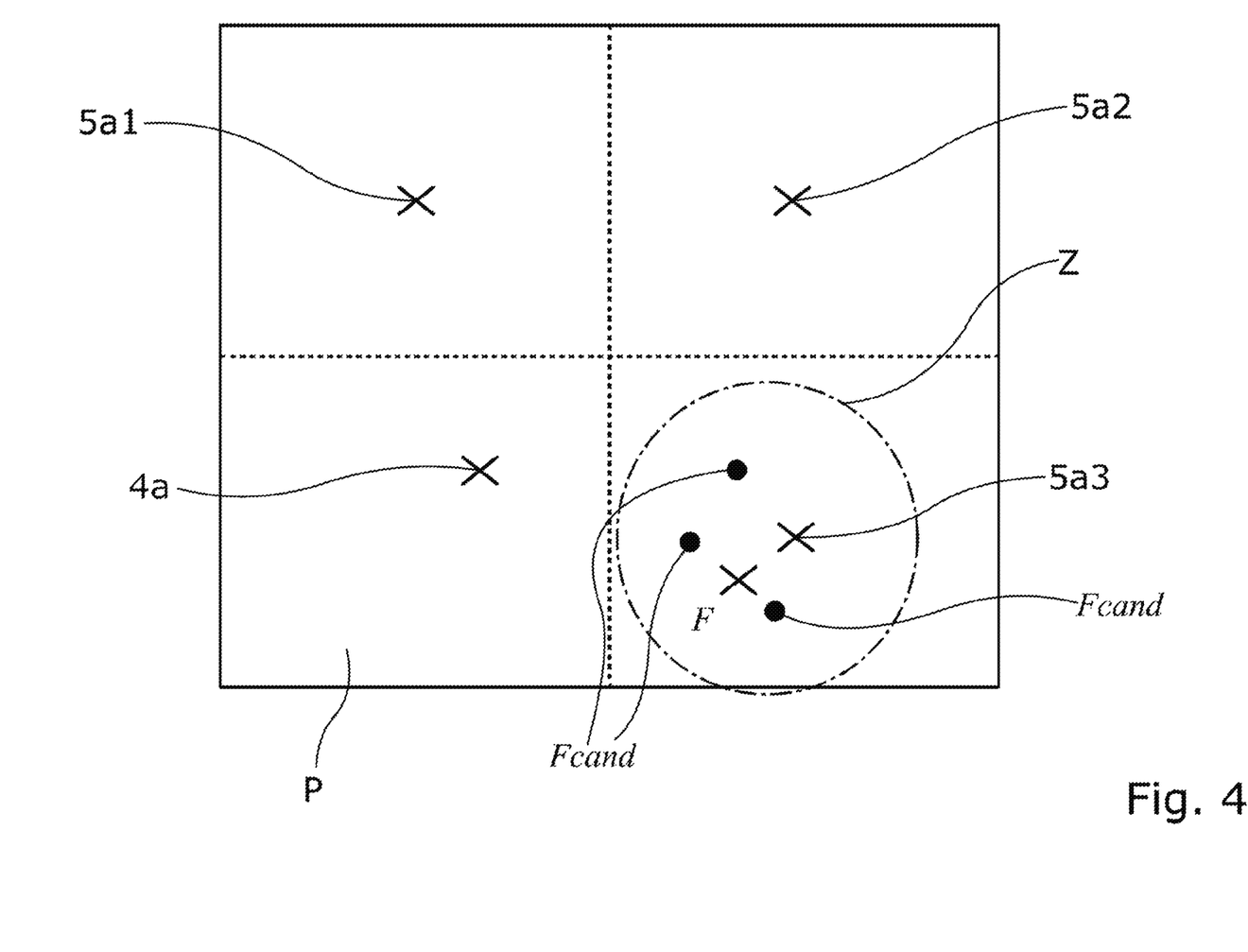
FIG. 4 is a schematic view of the skin to which sensors are attached of the system for estimating the parameters of an impact for the implementation of the method represented in FIG. 3.

An example of the method for estimating the parameters of an impact implemented by the central processing unit 3 will be described in relation to FIGS. 3 to 5, for estimating the parameters of an impact on the undersurface of the wing L. For this example, it is considered that the skin P on the undersurface is a plate for which three discriminant modes have been determined, that the first set of sensors 4 comprises a single sensor 4a and that the second set of sensors 5a comprises three sensors 5a1, 5a2, 5a3.

For this example, the assumption is made that the vibration measurements may be reasonably represented by the response to an impact of half-sine form and an impact law is used whereof the parameters are the position of the point of impact F on the skin P, the impact intensity I and the impact duration T. It is considered that the impact takes place near the sensor 4a3.

In a first step of the method, referred to as step EI of comparing, the central processing unit receives the signal S4a from the sensor 4a of the first set of sensors 4 and the signals S5a1, S5a2, S5a3 from the sensors 5a1, 5a2, 5a3 of the second set of sensors 5 and compares the normalized amplitude of each of the signals to a predetermined threshold K characterizing an abnormal event. The purpose of this comparison is to filter out the signals representative of a normal event such as, for example, a vibration of the skin due to high winds, or the normal support of a passenger boarding bridge against the skin of the aircraft.

The step of comparing E1 is performed at regular and successive time intervals $Int_{0 \ldots m}$, e.g. every 5 or 10 seconds.

If in a time interval $Int_{x, 1 \leq x \leq m}$, one of the signals S4$a$, S5$a$1, S5$a$2, S5$a$3 from the sensors 4$a$ 5$a$1, 5$a$2, 5$a$3 has an amplitude which exceeds the predetermined threshold K (condition represented by the reference Y/N in FIG. 3), then the central processing unit 3 implements a step E2 of locating an impact area in which the latter determines an area Z of the skin in which the impact has taken place. This area Z, represented in dotted lines in FIG. 4, is centered around the sensor 5$a$3 having first transmitted, in the time interval $Int_x$ considered (see FIG. 5), a signal S5$a$3 whereof the amplitude exceeds the predetermined threshold K.

Figure 5:
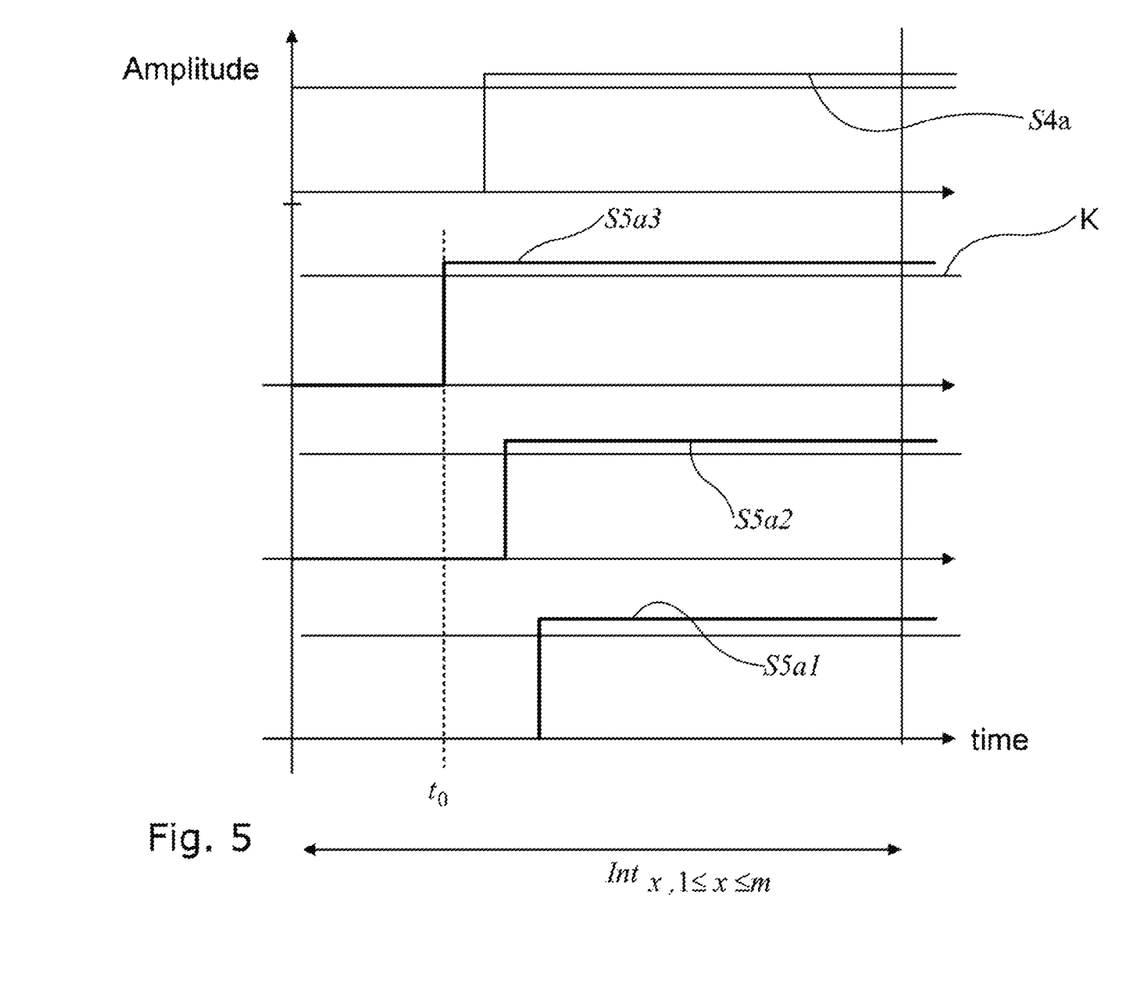
FIG. 5 is a representation of signals transmitted by sensors of the system for estimating the parameters of an impact during the implementation of the method represented in FIG. 3.

In parallel with step E2 of locating an impact area, the central processing unit 3 implements a step E3 of determining the instant of impact to which is the time at which the predetermined threshold K is exceeded for the first time in the interval $Int_x$ considered, by the amplitude of a signal S4$a$3 from the sensor array 2 (see FIG. 5). The instant of impact $t_0$ corresponds to the time from which the elastic waves are propagated in the skin P from the point of impact F and it thus constitutes the temporal starting point for analysing the signals provided by the first set of sensors 4.

It will be noted that the dimension of the area Z defined in step E2 of locating is an arbitrarily chosen constant. As a variant, the dimension of the area Z is a function, with predefined matching criteria, of the amplitude at the instant of impact to, of the signal S4$a$3 from the sensor 4$a$3 having first transmitted, in the time interval $Int_x$ considered, a signal whereof the amplitude exceeds the predetermined threshold K.

In a step E4 of processing vibration measurements, implemented after step E3 of determining an instant of impact to, the central processing unit 3 only receives the signal from the sensor 4$a$ of the first set of sensors 4 from a time subsequent to the instant of impact to and for a limited duration (e.g a duration allowing about ten oscillations of the discriminant mode with the smallest eigenfrequency for increasing the speed of implementation of the method by the central processing unit 3). The central processing unit 3, at the end of this step E4 thus has n observations denoted by $(q(t_i))_{1 \leq i \leq n}$, taken at instants $t_i = i\Delta t$ with $\Delta t$ the period of sampling of the sensor 4$a$ of the first set 4.

Optionally, and always for the purpose of reducing the amount of data to be processed, the central processing unit 3 also implements, in step E4 of receiving, a low-pass frequency filtering of the signal from the sensor 4$a$ of the first set 4 in order to cut out the high frequency components therefrom, and notably to remove the frequencies beyond the frequency of the highest discriminant mode.

Consecutively to step E4 of processing the vibration measurements, the central processing unit 3 implements a step E5 of optimizing for determining an estimate $\hat{T}$ of the duration of impact T and an estimate $\hat{X}_F$ (vector) of the contributions $X_F = (X_1 \ X_2 \ X_3)$ of the three discriminant modes in the response related to the point of impact F (the contributions of the discriminant modes also being referred to as the modal participation vector). These estimates are obtained from a mathematical response model $(\tilde{q}(ti))_{1 \leq i \leq n}$ of the sensor 4$a$ of the first set 4 to any excitations and from the observations obtained $(q(ti))_{1 \leq i \leq n}$ in the preceding step E4. The estimate $\hat{X}_F$ of the contributions $X_F = (X_1 \ X_2 \ X_3)$ of the three discriminant modes concentrates data making it possible, after suitable processing, to find an estimate of the position of the point of impact F on the skin P and an estimate $\hat{I}$ of the intensity of impact I.

The mathematical response model of the sensor 4$a$ of the first set of sensors 4 to any excitations makes it possible to predict the response of the sensor to a given excitation for the parameters (point of impact F, the intensity of impact f, duration of impact T) of the selected impact law. The mathematical model is determined from the modal superposition method which describes the response of the skin P to any excitation as being a superposition of the damped vibration modes of the skin.

In step E5 of estimating, the central processing unit 3 implements, for example, the nonlinear least squares method for minimizing the difference between the mathematical response model $(\tilde{q}(t_i))_{1 \leq i \leq n}$ of the sensor 4$a$ of the first set of sensors 4 and the observations $(q(t_i))_{1 \leq i \leq n}$. The object of the method employed is to calculate the values of the parameters which applied to the mathematical response model of the sensor 4$a$, best reproduce the observations $(q(t_i))_{1 \leq i \leq n}$.

Following step E5, and in a step E6 of locating a point of impact F the central processing unit 3 searches the rows of the modal matrix $\phi$ (truncated to the discriminant modes) of the skin which are collinear, with a predetermined tolerance, for the estimate $\hat{X}F$ of the contributions $X_F$ of the vibration modes of the skin P.

In a known manner, it is known that each row of the modal matrix 4L of the skin P is associated with a single point of the skin P and that the point of impact F can be found uniquely by seeking the only line collinear with the contribution $X_F$ of the vibration modes of the skin P. In the case of an estimate $\hat{X}_F$ of the contributions $X_F$ of the vibration modes of the skin P, a search is made for the collinear rows, within a predefined tolerance, which makes it possible to locate multiple candidate points, referred to as candidate points Fcand, close to the point of impact F.

Thus, in step E6, the central processing unit 3 determines the coordinates of at least one candidate point Fcand. In the example illustrated in the figure, the implementation of step E6 of locating gives three candidate points Fcand, all grouped around the point of impact F.

In an optional step E6' of confirmation, implemented after step E6 of locating the impact point F, the central processing unit 3 compares the coordinates of the candidate points of impact Fcand with the coordinates of the area Z defined in step E2 of locating an impact area. A candidate point Fcand whereof the coordinates are not found in the impact area is not considered in the rest of the method.

Finally, in a step E7 of estimating the energy of the impact, the central processing unit 3 first estimates the intensity I of the impact for each candidate point Fcand. The estimate $\hat{I}$ of the intensity I of the impact at a candidate point Fcand is obtained by calculating a coefficient of collinearity between the row of the modal matrix $\phi$ associated with the candidate point Fcand and the estimate $\hat{X}_F$ of the modal participation vector. For each candidate point Fcand, the central processing unit 3 calculates an impact force with the parameters $(\hat{T}, \hat{I})$ and the acceleration at the candidate point Fcand with the parameters $(\hat{T}, \hat{I}, \hat{X}_F)$. The central processing unit 3 integrates twice the acceleration of Fcand to obtain the displacement. The impact energy E associated with a candidate point Fcand is estimated by integrating the product of the force by the displacement over the duration of the vibration measurements.

The last step of the method is a step E8 of warning in which the central processing unit 5 transmits a warning signal Salert to operators of the aircraft in the event that the estimate Ê of the impact energy at a candidate point Fcand calculated in the preceding step E7 is greater than a predetermined threshold G. The warning signal Salert contains data on the estimate E of the impact energy and the position of the candidate point Fcand. The method loops back to step E1 of comparing following step E8 of warning.

The method as described above is implemented, for example, when the aircraft A is powered down or when the aircraft A is powered on until the first start-up of the engine and five minutes after the engines have shut down.

An aircraft A according to the disclosure herein may proceed, automatically and in real time, to a self-diagnosis for estimating the parameters of an impact. The estimated parameters are supplied to the operators of the aircraft to launch, if necessary, maintenance operations on the aircraft A in case of damage to the skin following the impact.

The method has been described starting from the assumption that the impact form is represented by a half sine. Other impact forms and/or impact laws, which determine the impact parameters, may be used.

The method has been described for a first set of sensors 4 comprising a single sensor 4a. In the event that the first set of sensors 5 contains multiple sensors, the central processing unit 3 performs steps E4 to E7 for each sensor 5a of the first set and:
  retains the results of the sensor 4a of the first set of sensors which makes the best measurement predictions (i.e. the sensor whereof the predictions give the smallest residue in the least squares method); or
  combines the measurements of each sensor 4a and minimizes the total prediction-measurement differences of all the sensors 4a of the first set of sensors 4.

According to a variant of the disclosure herein, not illustrated in the figures, the central processing unit 3 comprises a database in which the intrinsic properties of the aircraft are recorded (age, repairs made, known deformations of the skin) in order to specifically adapt the method of estimating as described above to the aircraft. The properties recorded in the database make it possible, for example, to refine the mathematical response model of the sensors of the first set 5 to excitations.

As a variant, the database comprises a log of the impact parameters previously estimated by the system for estimating the parameters of an impact, and for each estimate implemented, the actual coordinates of the point of impact as detected visually by operators. The central processing unit 3, by implementing a learning algorithm, may refine the algorithm implemented in the method as described above for reducing the difference in position between the determined candidate points of impact Fcand and the point of impact F following an impact.

Figure 6:
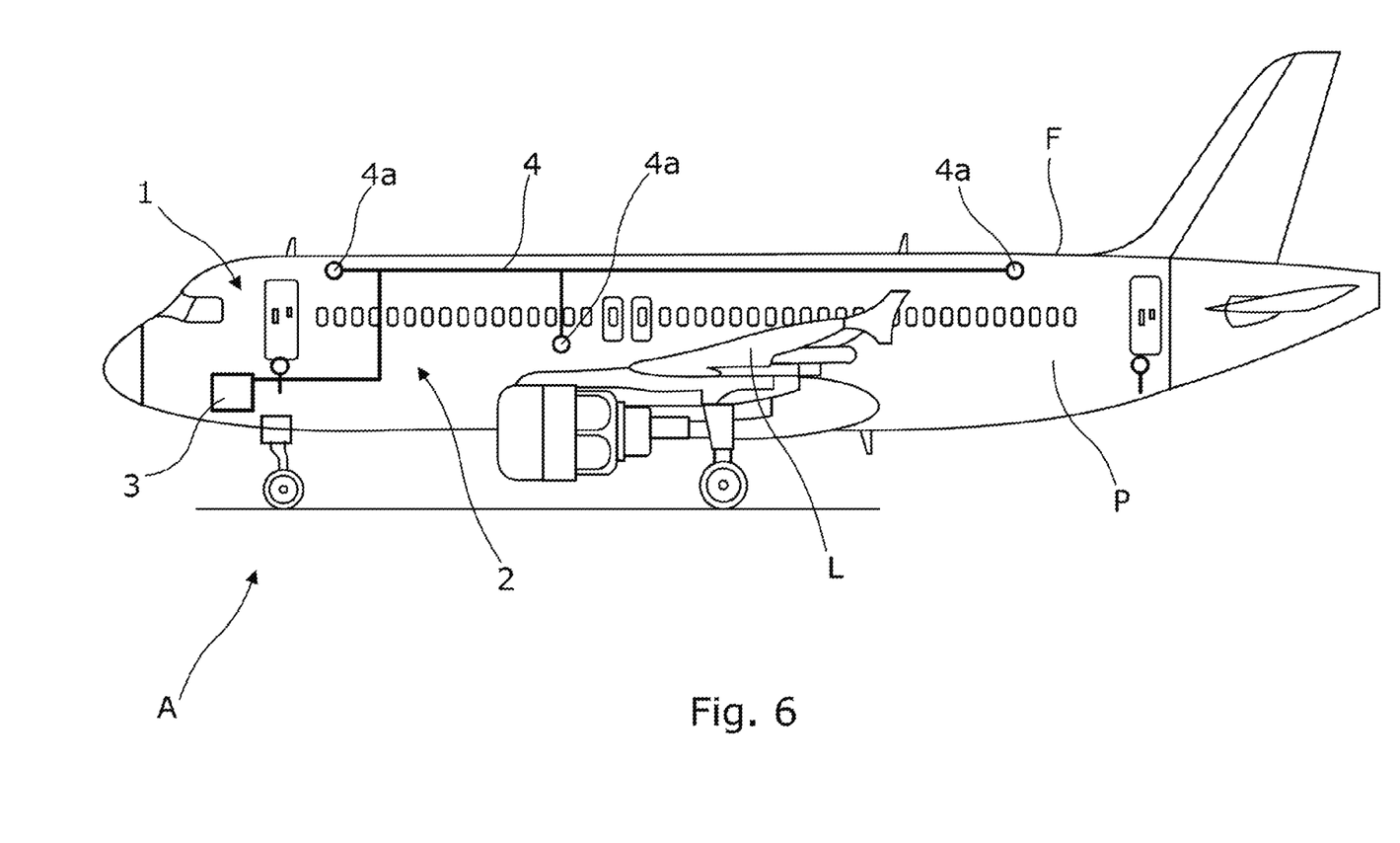
FIG. 6 is a similar view to FIG. 1, of an aircraft equipped with a system for estimating the parameters of an impact according to another embodiment of the disclosure herein.

The system for estimating the parameters of an impact 1 has been described for an array of sensors 2 which comprises a first set of sensors 4 and a second set of sensors 5 assisting the first set 4 of sensors in determining the instant of impact $t_0$. As a variant, and in relation to FIG. 6, the system for estimating the parameters of an impact 1 does not comprise a second set of sensors 5 for assisting the first set of sensors 4 in determining the instant of impact. The method for estimating the parameters of an impact 1 implemented by the system for estimating the parameters of an impact 1 according to this variant is identical to the method as described above, except that only the signals from the first set of sensors 5a are taken into account in the steps of the method. This variant applies to small aircraft for which the instant of impact and the instant of the vibration measurements coincide. The advantage lies in using fewer sensors and identifying the impact faster.

Although described for an aircraft A, the principle of estimating the parameters of an impact as described will be applicable to any vehicle or structure liable to undergo impacts.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps, Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s), In addition, in this disclosure, the terms "comprise" or "comprising" do not exclude other elements or steps, the terms "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
a skin forming an outer surface of the aircraft; and
a system configured for estimating parameters of an impact, the system comprising:
  an array of sensors attached to the skin, the array of sensors comprising a first set of sensors providing data relating to elastic waves;
  a central processing unit connected to the array of sensors, the central processing unit being configured for assessing the parameters of an impact from the data of the array of sensors and a response model of the skin to external excitations calculated from modal properties of the skin; and
  a database comprising data on intrinsic properties of the aircraft, wherein the system is configured to use the intrinsic property data in the database to adapt an estimation of the parameters of the impact to the aircraft;
wherein the sensors of the first set of sensors are located at neutral points of the skin of the aircraft relative to discriminant vibration modes of the skin.

2. The aircraft according to claim 1, wherein the sensors of the first set of sensors are accelerometers.

3. The aircraft according to claim 1, wherein the array of sensors comprises a second set of sensors providing data relating to temporal detection of an impact instant.

4. The aircraft according to claim 3, wherein the sensors of the second set of sensors are located in areas of the aircraft statistically most affected by impacts.

5. The aircraft according to claim 3, wherein the sensors of the second set of sensors are microphone sensors or piezoelectric sensors.

6. A method for estimating parameters of an impact on a skin of an aircraft, the aircraft comprising a system for estimating parameters of an impact comprising an array of sensors attached to the skin and a central processing unit connected to the array of sensors, the array of sensors comprising a first set of sensors providing data relating to elastic waves, the central processing unit configured for assessing the parameters of an impact from the data of the array of sensors and a response model of the skin to external excitations calculated from modal properties of the skin, the method comprising:

- receiving at the central processing unit, the signals from each of the sensors of the array of sensors and comparing, at the central processing unit, an amplitude of each of the signals to a predetermined threshold characterizing an abnormal event;
- locating an impact area, implemented if one of the signals from the sensors of the sensor array has an amplitude which exceeds the predetermined threshold, and determining, at the central processing unit, an area of the skin in which an impact has taken place of an element external to the aircraft with the skin;
- determining, simultaneously with locating the impact area, at the central processing unit, from the signals of the sensors of the sensor array, an instant of impact corresponding to an instant of contact of the element external to the aircraft with the skin;
- receiving, at the central processing unit, the signal from a sensor of the first set of sensors from a time subsequent to the instant of impact and for a predetermine duration, and processing vibration measurements;
- estimating, at the central processing unit, a duration of impact and estimating contributions of vibration modes of the skin, the estimates being calculated from the signals of the sensor of the first set of sensors received for processing vibration measurements and from a mathematical response model of the sensor of the first set to any excitations;
- locating a point of impact in which the central processing unit determines coordinates of an estimated point of impact, termed a candidate point of impact, from a collinearity search among rows of a modal matrix of the skin and the estimate of the contributions of vibration modes of the skin;
- estimating energy of the impact, in which the central processing unit estimates impact energy at each candidate point of impact;
- adapting an estimate of an intensity of the impact at a candidate point based on intrinsic property data about the aircraft stored in a database; and
- transmitting a warning signal, from the central processing unit, when the estimate of intensity of the impact at the candidate point is greater than a predetermined threshold;
- wherein the sensors of the first set of sensors are located at neutral points of the skin of the aircraft relative to discriminant vibration eigenmodes of the skin.

7. The method according to claim 6, wherein the area determined in the step of locating the impact area is centered on a sensor having transmitted a signal whereof the amplitude exceeds the predetermined threshold.

8. The method according to claim 7, wherein comparing the amplitude of each of the signals is performed at regular and successive time intervals.

9. The method according to claim 6, wherein after locating the point of impact and prior to estimating the energy of the impact, the method further comprises comparing, using the central processing unit, the coordinates of the candidate points of impact with the coordinates of the area defined while locating the impact area.

* * * * *